(12) United States Patent
Balasubramanian et al.

(10) Patent No.: US 9,501,122 B2
(45) Date of Patent: Nov. 22, 2016

(54) DIRECTING A POWER SIGNAL FROM A PORT POWER CONTROLLER TO ONE OF MULTIPLE PHYSICAL PORTS

(71) Applicant: Cisco Technology, Inc., San Jose, CA (US)

(72) Inventors: Koussalya Balasubramanian, Sunnyvale, CA (US); Shashi Kumar, Saratoga, CA (US); Sandeep Arvindkumar Patel, Los Gatos, CA (US); Anoop Vetteth, Fremont, CA (US); Frederick R. Schindler, Sunnyvale, CA (US)

(73) Assignee: CISCO TECHNOLOGY, INC, San Jose, CA (US)

(\*) Notice: Subject to any disclaimer, the term of this patent is extended or adjusted under 35 U.S.C. 154(b) by 0 days.

(21) Appl. No.: 13/927,879

(22) Filed: Jun. 26, 2013

(65) Prior Publication Data
US 2013/0297955 A1    Nov. 7, 2013

Related U.S. Application Data

(63) Continuation of application No. 13/047,417, filed on Mar. 14, 2011, now Pat. No. 8,499,177.

(51) Int. Cl.
*G06F 1/00* (2006.01)
*G06F 1/26* (2006.01)
*H04L 12/10* (2006.01)
*H04L 12/40* (2006.01)

(52) U.S. Cl.
CPC ............... *G06F 1/266* (2013.01); *H04L 12/10* (2013.01); *H04L 12/40045* (2013.01)

(58) Field of Classification Search
CPC ........................................................ G06F 1/266
USPC ........................................................ 713/300
See application file for complete search history.

(56) References Cited

U.S. PATENT DOCUMENTS

| 7,373,528 | B2 | 5/2008 | Schindler |
| 7,471,014 | B2 | 12/2008 | Lum et al. |
| 7,472,290 | B2 | 12/2008 | Diab et al. |
| 7,478,251 | B1 | 1/2009 | Diab et al. |
| 7,593,747 | B1 | 9/2009 | Karam et al. |
| 7,593,756 | B2 | 9/2009 | Ferentz et al. |
| 7,603,570 | B2 | 10/2009 | Schindler et al. |

(Continued)

FOREIGN PATENT DOCUMENTS

EP    1936861 A1    6/2008

*Primary Examiner* — Robert Cassity
(74) *Attorney, Agent, or Firm* — Polsinelli PC

(57) ABSTRACT

A technique is able to direct a power signal from a port power controller to one of multiple physical ports. The technique involves activating a set of port power controllers. Each port power controller is constructed and arranged to deliver power to a device through at most one physical port at a time. The technique further involves performing a set of discovery operations to discover device presence, the set of discovery operations providing discovery data. The technique further involves providing, based on the discovery data provided by the set of discovery operations, a set of switching signals to switching circuitry which is coupled to a set of physical ports. The switching circuitry is constructed and arranged to steer power signals from the activated set of port power controllers through the set of physical ports to deliver power to a set of devices.

18 Claims, 6 Drawing Sheets

(56) References Cited

U.S. PATENT DOCUMENTS

| | | |
|---|---|---|
| 7,613,939 B2 | 11/2009 | Karam et al. |
| 7,620,846 B2 | 11/2009 | Biederman et al. |
| 7,697,251 B2 | 4/2010 | Karam |
| 7,770,035 B1 | 8/2010 | John et al. |
| 7,793,137 B2 | 9/2010 | Karam et al. |
| 7,836,336 B2 | 11/2010 | Biederman et al. |
| 7,849,351 B2 | 12/2010 | Karma et al. |
| 7,873,845 B2 | 1/2011 | Vetteth |
| 7,903,809 B2 | 3/2011 | Karam |
| 7,930,568 B2 | 4/2011 | Schindler |
| 8,099,611 B2 | 1/2012 | Karam |
| 8,106,530 B2 | 1/2012 | Schindler et al. |
| 8,122,266 B2 | 2/2012 | Karam |
| 8,171,315 B2 | 5/2012 | Karam et al. |
| 8,793,511 B1 * | 7/2014 | Bishara .................. G06F 1/266 713/300 |
| 2005/0243861 A1 * | 11/2005 | Elkayam et al. ............ 370/466 |
| 2005/0283627 A1 * | 12/2005 | Diab et al. .................... 713/300 |
| 2006/0112285 A1 * | 5/2006 | Stineman, Jr. ................ 713/300 |
| 2007/0121929 A1 * | 5/2007 | Korcharz et al. ............ 379/413 |
| 2009/0100275 A1 | 4/2009 | Chang et al. |
| 2009/0299538 A1 | 12/2009 | Suzuki |
| 2010/0306565 A1 * | 12/2010 | Umedu ........................ 713/324 |
| 2011/0121810 A1 * | 5/2011 | Tsai .............................. 323/318 |

* cited by examiner

DIRECTING A POWER SIGNAL FROM A PORT POWER CONTROLLER TO ONE OF MULTIPLE PHYSICAL PORTS

CROSS REFERENCE TO RELATED APPLICATIONS

This patent application is a Continuation of U.S. patent application Ser. No. 13/047,417 filed on Mar. 14, 2011, entitled, "DISCOVERING A DEVICE PRESENCE AND DIRECTING A POWER SIGNAL TO THE DEVICE FROM A PORT POWER CONTROLLER THROUGH AT MOST ONE OF MULTIPLE PHYSICAL PORTS AT A TIME", the contents and teachings of which are hereby incorporated by reference in their entirety.

BACKGROUND

A conventional Power over Ethernet (PoE) system includes power sourcing equipment (PSE) and one or more powered devices (PDs) that connect to the PSE through cabling (e.g., CAT5, CAT5e, CAT6, etc.). IEEE 802.3af-2003 is a standard for delivering up to 12.95 Watts to a PD. IEEE 802.3at-2009 is a standard for delivering up to 25.5 Watts of power to a PD.

Before the PSE delivers any power to a PD through one of its ports, the PSE typically performs a discovery operation through that port. For example, if the PSE does not detect a particular impedance which identifies the PD as a device which can receive power through that port, the PSE does not deliver power through that port thus preventing damage to the device. However, if the PSE detects the particular impedance through that port, the PSE delivers power to the PD through that port. IEEE 802.3af-2003 (PoE) and IEEE 802.3at-2009 (PoE Enhancements) provide additional detection and classification details.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique involves directing a power signal from a port power controller (e.g., a PSE controller) to one of multiple physical ports (e.g., RJ45 ports) through switching circuitry. Such a technique is capable of providing a PSE with significant power delivery flexibility without the need to over provision the PSE with an excessive number port power controllers. In particular, suppose that each port power controller of a PSE device is capable of providing up to a predefined amount of power (e.g., 30 Watts) to an external device through a physical port. Further suppose that the external device is able to draw more than the predefined amount of power (e.g., the external device indicates to the PSE that the PSE should provide more than 30 Watts). In this situation, the switching circuitry is able to steer power from multiple port power controllers of the PSE to the external device through the same physical port to accommodate the power needs of the external device. Such a technique alleviates the need to provision each physical port of the PSE device with multiple dedicated port power controllers (i.e., multiple port power controllers which are exclusively dedicated to that physical port).

One embodiment is directed to a method which includes activating a set of port power controllers. Each port power controller is constructed and arranged to deliver power to a device through at most one physical port at a time. The method further includes performing a set of discovery operations to discover device presence, the set of discovery operations providing discovery data. The method further includes providing, based on the discovery data provided by the set of discovery operations, a set of switching signals to switching circuitry which is coupled to the set of physical ports. The switching circuitry is constructed and arranged to direct power signals from the activated set of port power controllers through the set of physical ports to deliver power to a set of devices. Such a method is thus able to steer a power signal from a port power controller (e.g., a PSE controller) to one of multiple physical ports.

Other embodiments are directed to an apparatus and a system for steering a power signal from a port power controller to one of multiple physical ports. Yet other embodiments are directed to logic (e.g., a computer program product, logic circuitry, etc.) for steering a power signal from a port power controller to one of multiple physical ports, and so on.

Description of Example Embodiments

Figure 1:
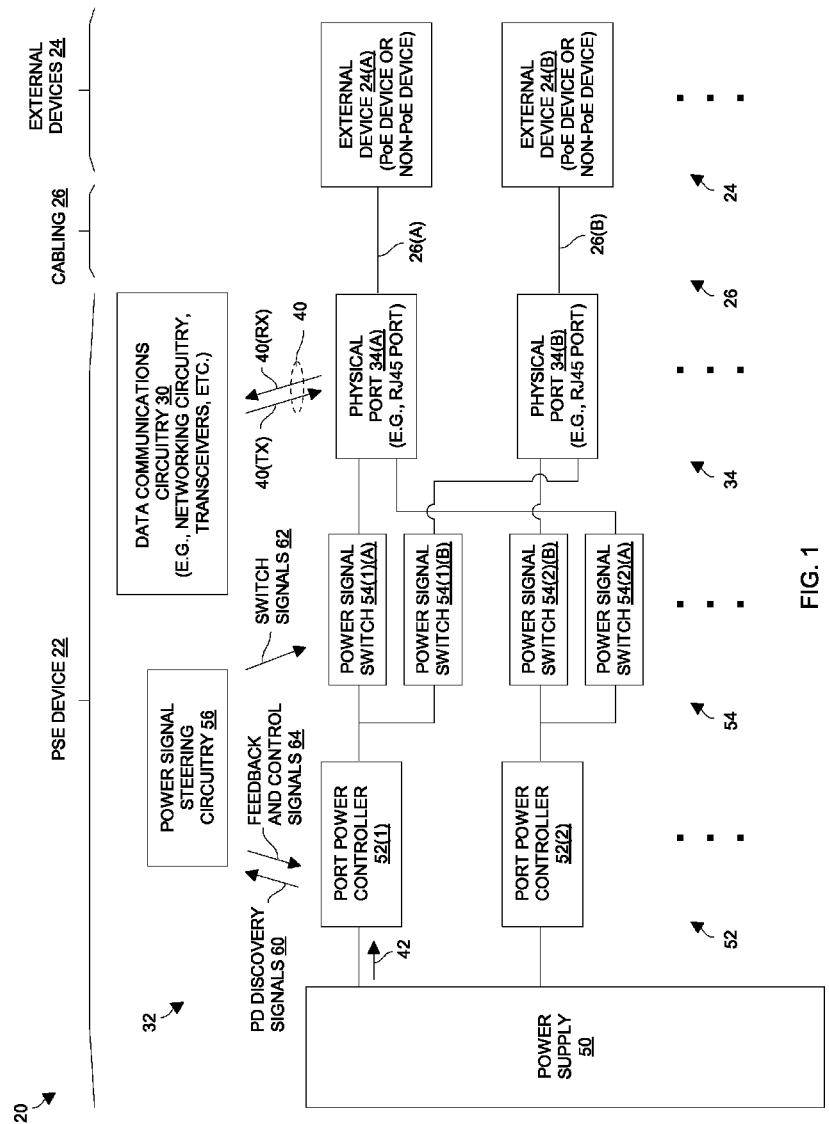
FIG. 1 is a block diagram of an electronic environment which involves directing a power signal from a port power controller to one of multiple physical ports.

FIG. 1 shows an electronic environment 20 having a PSE device 22, external devices 24(A), 24(B), . . . (collectively, external devices 24) and cabling 26(A), 26(B), . . . (collectively, cabling 26). The external devices 24 may include PDs as well as devices which are not able to accept inline power. Advantageously, the PSE device 22 is equipped with electronic circuitry which enables steering of a power signal from a port power controller to different physical ports for flexible inline power delivery.

As shown in FIG. 1, the PSE device 22 includes data communications circuitry 30, power delivery circuitry 32 (illustrated generally by the arrow 32), and physical ports 34(A), 34(B), . . . (collectively, physical ports 34). The data communications circuitry 30 is constructed and arranged to perform data communications operations and exchange data signals 40(TX), 40(RX) (collectively, data signals 40) with the external devices 24 through the physical ports 34. The power delivery circuitry 32 is constructed and arranged to identify the presence of PDs among the external devices 24, and to deliver inline power signals 42 appropriately to the PDs through the physical ports 34 (e.g., 15 Watts, 30 Watts, greater than 30 Watts, etc.).

The power delivery circuitry 32 includes a power supply 50, port power controllers 52(1), 52(2), . . . (collectively, port power controllers 52), power signal switches 54(1)(A), 54(1)(B), 54(2)(A), 54(2)(B), . . . (collectively, power signal switches 54), and power signal steering circuitry 56. Preferably, the power supply 50 has enough capacity to power the operation of multiple PDs through multiple physical ports 34 as well as power the PSE device 22 itself.

Each port power controller 52 couples to multiple power signal switches 54 leading to multiple physical ports 34. For example, the port power controller 52(1) couples to power signal switches 54(1)(A) and 54(1)(B) which lead to physical ports 34(A) and 34(B), respectively. Similarly, the port power controller 52(2) couples to power signal switches 54(2)(A) and 54(2)(B) which lead to physical ports 34(A) and 34(B), respectively. In some arrangements, the power signal switches 54 are discrete transistors which are capable of handling relatively large amounts of current (e.g., MOSFETs).

The power signal switches 54 form an array of switches 54 which steers power signals 42 from different port power controllers 52 to different physical ports 34. That is, such a switch arrangement enables direction of a power signal 42 from each port power controller 52 to one of multiple physical ports 34 in the manner of a de-multiplexer. Furthermore, such a switch arrangement enables each physical port 34 to receive power signals 42 from multiple port power controllers 52, perhaps simultaneously if delivering inline power to a high power PD.

It should be understood that each port power controller 52 is shown in FIG. 1 as coupling to two power signal switches 54 respectively leading to two physical ports 34 by way of example and for simplicity. However, as illustrated by the ellipses (" . . . ") in FIG. 1, each port power controller 52 may couple to more than two power signal switches 54 leading to more than two physical ports 34. In some arrangements, the array of switches 54 is constructed and arranged to provide 1-to-any connectivity to any physical port 34 of the PSE device 22.

It should be further understood that, upon activation, the power signal steering circuitry 56 obtains a set of PD discovery signals 60 and the port power controllers 52 are capable of running in a variety of operating modes. For example, in discovery mode, the port power controllers 52 do not provide inline power but periodically sense for characteristic impedance which indicates the presence of PDs. In some embodiments, the power signal steering circuitry 56 is pre-configured to provide a set of switch signals 62 to the power signal switches 54 to initially connect each port power controller 52 to a respective physical port 34.

Once a port power controller 52 connects to a respective physical port 34, the port power controller 52 performs inline power discovery operations (e.g., PD detection and classification). If the port power controller 52 discovers a PD in need of inline power, the port power controller 52 delivers inline power to that PD. However, if the port power controller 52 does not discover a PD in need of inline power, the power signal steering circuitry 56 can decide to connect the port power controller 52 a different physical port 34 to discover a PD which may need inline power.

As shown in FIG. 1, one will appreciate that the port power controller 52(1) is capable of performing PD discovery and power up operations with the external device 24(A) through the power signal switch 54(1)(A) and the physical port 34(A). Likewise, the port power controller 52(2) performs PD discovery and power up operations with the external device 24(B) through the power signal switch 54(2)(B) and the physical port 34(B), and so on.

Since there are alternative pathways available, it is further possible for the port power controllers 52 to perform PD discovery and power up operations through other power signal switches 54 as well. For example, the port power controller 52(1) is capable of performing PD discovery and power up operations with the external device 24(B) through the power signal switch 54(1)(B) and the physical port 34(B). Similarly, the port power controller 52(2) is capable of performing PD discovery and power up operations with the external device 24(A) through the power signal switch 54(2)(A) and the physical port 34(A), and so on.

Once the port power controllers 52 have completed inline power discovery operations with the external devices 24, the port power controllers 52 pass the results of the inline PD discovery operations to the power signal steering circuitry 56 via PD discovery signals 60. It should be understood that, due to the switching operation of the power signal steering circuitry 56, each port power controller 52 attaches to only one physical port 34 at a time.

Additionally, the power signal steering circuitry 56 is capable of providing feedback and control signals 64 to the port power controllers 52. Such signals 64 enable, among other things, the port power controllers 52 to coordinate their operation among each other. For example, in response to a power negotiation operation resulting in discovery of a high power PD, the power signal steering circuitry 56 able to coordinate delivery of inline power from multiple port power controllers 52 through the same physical port 34, i.e., delivery of up to 60 Watts from two port power controllers 52 to a PD through a physical port 34.

It should be understood that the port power controllers 52 are capable of routinely re-performing the inline power negotiation operations with the external devices 24, and then updating the PD discovery signals 60 provided to the power signal steering circuitry 56. For example, while in discovery mode, the port power controllers 52 can periodically sense for new PDs on physical ports 34 which originally did not connect to PDs.

Additionally, while in inline power mode, the port power controllers 52 can periodically renegotiate power delivery with existing PDs in response to certain events (e.g., based on a time schedule, a change in power demand, periodically, etc.). As a result of the activity of the power signal steering circuitry 56, the power signal steering circuitry 56 may maintain the switch signals 62 at existing settings to maintain the power delivery configuration of the PSE device 22, or alter the switch signals 62 from the existing settings to re-distribute the power signals 42 to among the external devices 24. Furthermore, via the feedback and control signals 64, the power signal steering circuitry 56 can coordinate operation of the port power controllers 52 in an ongoing manner.

In some arrangements, each port power controller 52 performs PD discovery during a discovery phase, and PD classification during a classification phase through at least one physical port 34. Furthermore, when a port power controller 52 delivers inline power through a physical port 34, the port power controller 52 preferably regulates and conditions its power signal 42 for proper delivery of power to the PD. The particular operation of each port power controller 52 may be defined by one or more PoE standards including IEEE 802.3af-2003 and IEEE 802.3at-2009.

Additionally, transceivers of the data communications circuitry 32 exchange transmit signals 40(TX) and receive signals 40(RX) with the external devices 24 through the physical ports 34. In some arrangements, networking circuitry of the data communications circuitry 32 operates as network node (e.g., a router, a network switch, etc.). In other arrangements, the networking circuitry of the data communications circuitry 32 operates as an endpoint device (e.g., a Voice over IP system manager, a closed-circuit television server, etc.).

Furthermore, the wiring pathways for the cabling 26 preferably includes eight copper conductors arranged as four twisted wire pairs for two-pair inline power delivery (e.g., up to 30 Watts) or four-pair inline power delivery (e.g., up to 60 Watts). Suitable wiring for the cable 26 includes (e.g., CAT5, CAT5e, CAT6, and the like). Such wiring enables conveyance of the high speed data signals 40 between the PSE device 22 and PDs, as well as power signals 42 from the PSE device 22 to the PDs. Further details will now be provided with reference to FIG. 2.

Figure 2:
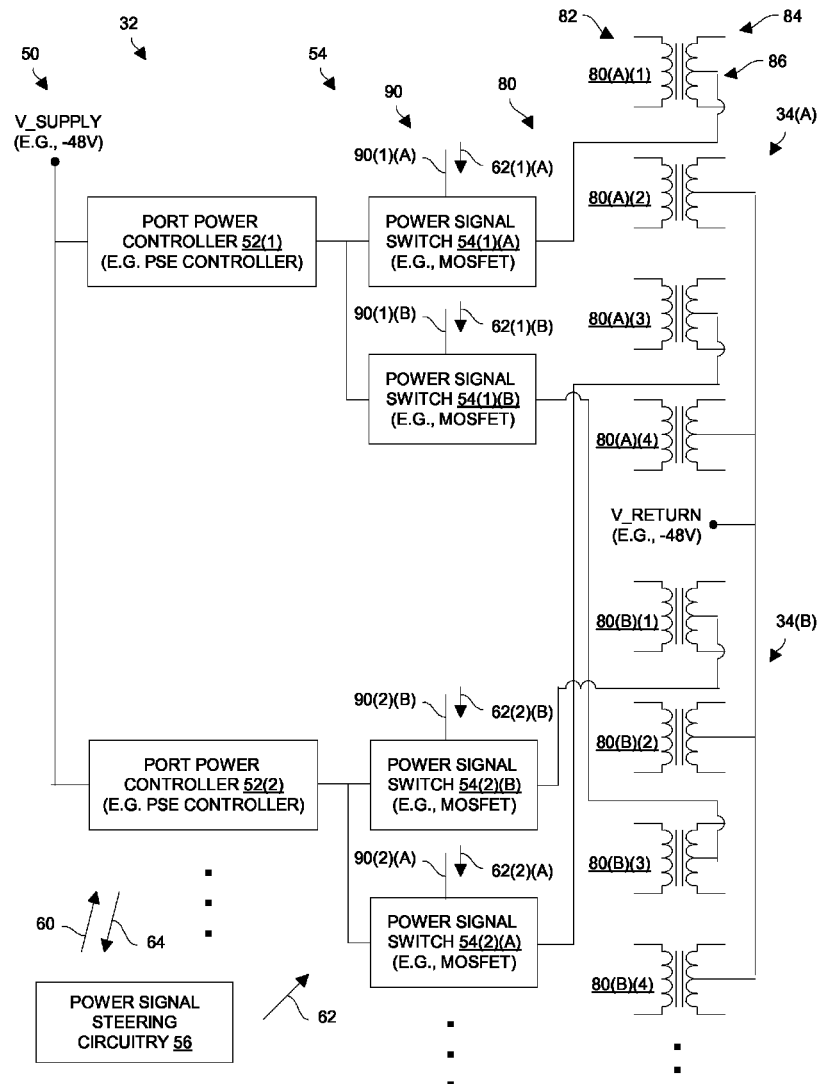
FIG. 2 is a block diagram of particular details of a PSE device of FIG. 1.

FIG. 2 shows particular details of the power delivery circuitry 32 of the PSE device 22. In FIG. 2, the power supply 50 is represented as source V_supply and return V_return (e.g., −48 Volts).

Additionally, each physical port 34 includes four isolation transformers 80. For example, the physical port 34(A) includes isolation transformers 80(A)(1), 80(A)(2), 80(A)(3), 80(A)(4). Similarly, the physical port 34(B) includes isolation transformers 80(B)(1), 80(B)(2), 80(B)(3), 80(B)(4), and so on.

The primary side 82 of each isolation transformer 80 connects to the data communications circuitry 30, and the secondary side 84 of each isolation transformer 80 connects with the cabling 26 (also see FIG. 1), e.g., via an RJ45 connector. As a result, the data communications circuitry 30 (FIG. 1) is able to effectively send and receive data communications signals 40 through the physical ports 34 while maintaining DC electrical isolation with the secondary side 84 of the physical ports 34.

The secondary sides 84 of the isolation transformers 80 have center taps 86 which connect to either a particular power signal switch 54 or the V_return of the power supply 50 (also see FIG. 1). Specifically, in connection with physical port 34(A), the center tap 86 of transformer 80(A)(1) connects to the power signal switch 54(1)(A), the center tap 86 of transformer 80(A)(2) connects to V_return, the center tap 86 of transformer 80(A)(3) connects to the power signal switch 54(2)(A), and the center tap 86 of transformer 80(A)(4) connects to V_return. Likewise, in connection with physical port 34(B), the center tap 86 of transformer 80(B)(1) connects to the power signal switch 54(2)(B), the center tap 86 of transformer 80(B)(2) connects to V_return, the center tap 86 of transformer 80(B)(3) connects to the power signal switch 54(1)(B), and the center tap 86 of transformer 80(B)(4) connects to V_return.

Each power signal switch 54 has a control terminal 90 which receives a specific switch signal 62 from the power signal steering circuitry 56 to control steering of power signals 42 from the power supply 50 to the physical ports 34. In particular, control terminal 90(1)(A) receives a switch signal 62(1)(A) which opens and closes the power signal switch 54(1)(A). Control terminal 90(1)(B) receives a switch signal 62(1)(B) which opens and closes the power signal switch 54(1)(B). Control terminal 90(2)(A) receives a switch signal 62(2)(A) which opens and closes the power signal switch 54(2)(A). Control terminal 90(2)(B) receives a switch signal 62(2)(B) which opens and closes the power signal switch 54(2)(B).

At this point, it should be understood that the power delivery circuitry 32 of the PSE device 22 is capable of controlling connectivity between the port power controllers 52 and the physical ports 34. For example, by opening and closing particular power signal switches 54, the power delivery circuitry 32 is capable of connecting one port power controller 52 to a physical port 34 (e.g., to provide up to 30 Watts to a PD), or multiple port power controllers 52 to the physical port 34 (e.g., to provide up to 60 Watts to the PD).

For example, suppose that there are no external devices 24 in need of inline power. In this situation, the power signal steering circuitry 56 preferably connects each port power controller 52 to a particular physical port 34 to allow circuitry within that port power controller 52 to sense for the characteristic impedance of a PD (i.e., when someone connects a PD to the physical port 34). Here, the power signal steering circuitry 56 can provide a switch signal 62(1)(A) to the control terminal 90(1)(A) to close the power signal switch 54(1)(A). At the same time, the power signal steering circuitry 56 can provide a switch signal 62(1)(B) to the control terminal 90(1)(B) to open the power signal switch 54(1)(B) and thus disconnect the port power controller 52(1) from the physical port 34(B). As a result, the port power controller 52(1) is able to sense for the characteristic impedance of a PD through transformers 80(A)(1) and 80(A)(2) of the physical port 34(A).

Similarly, the power signal steering circuitry 56 can provide a switch signal 62(2)(B) to the control terminal 90(2)(B) to close the power signal switch 54(2)(B). At the same time, the power signal steering circuitry 56 can provide a switch signal 62(2)(A) to the control terminal 90(2)(A) to open the power signal switch 54(2)(A) and thus disconnect the port power controller 52(2) from the physical port 34(A). Thus, the port power controller 52(2) is able to sense for the characteristic impedance of a PD through transformers 80(B)(1) and 80(B)(2) of the physical port 34(B).

In some arrangements, each power signal switch 54 is a MOSFET and the control terminal 90 of that power signal switch 54 is the gate of that MOSFET. In these arrangements, the power signal steering circuitry 56 preferably provides separate switch signals 62 to control each MOSFET. In certain arrangements, the switch signal 62 to close a MOSFET is a logically inverted form of the switch signal 62 to open another MOSFET.

It should be understood that since the port power controllers 52 have been activated (e.g., they are fully operational and connected to the power supply 50), the port power controllers 52 are able to provide power signals 42 in response to PD discovery. In some arrangements, the maximum amount of inline power that can be supplied by each port power controller 52 is 30 Watts although the PSE device 22 is capable of delivering up to 60 Watts through a physical port 34 by switching multiple port power controllers 52 to the same physical port 34.

Figure 3:
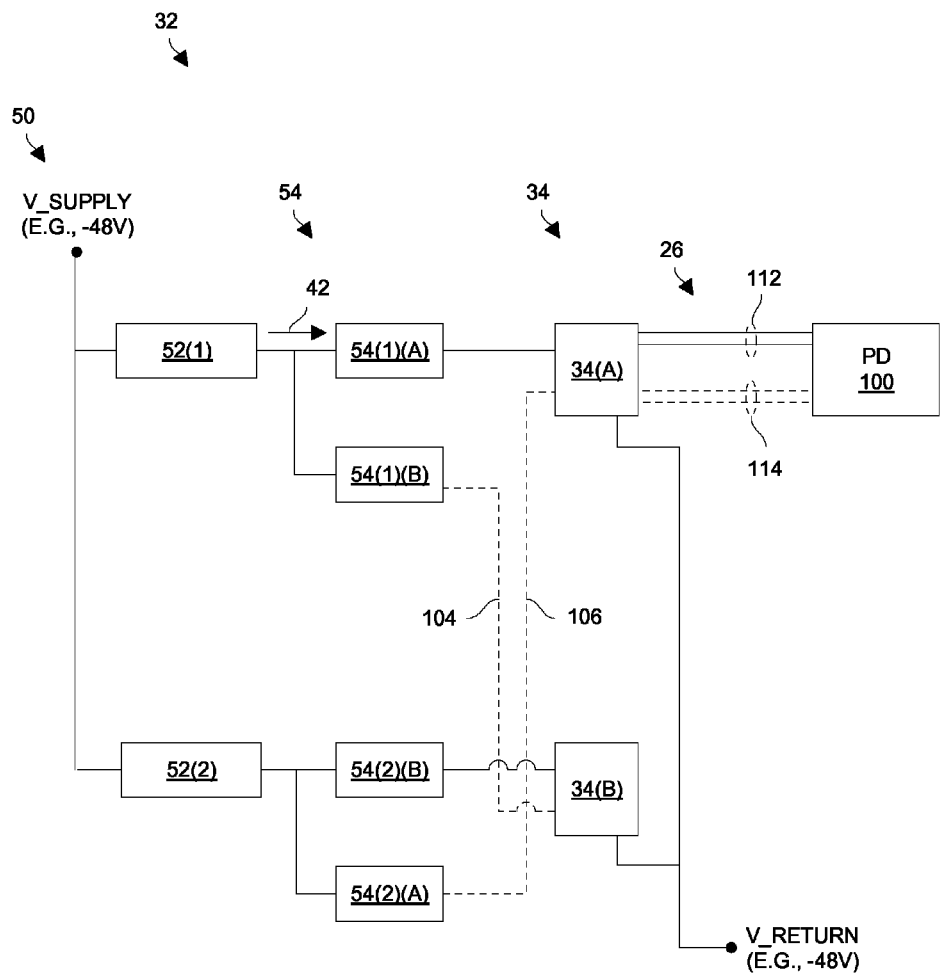
FIG. 3 is a block diagram of a first power delivery topology for the electronic environment of FIG. 1.

FIG. 3 shows a situation in which a PD 100 connects to physical port 34(A), and in which there is no PD connected to physical port 34(B). Here, the power signal steering circuitry 56 provides a set of switch signals 62 to the power signal switches 54 to create a first switch configuration (also see FIGS. 1 and 2) which enables the port power controllers 52 to sense for the presence of PDs through the physical ports 34. In particular, the power signal switch 54(1)(A) is closed, and the power signal switch 54(1)(B) is opened. Accordingly, the port power controller 52(1) connects to the physical port 34(A) but is disconnected from the physical port 34(B), i.e., the disconnected path 104 from the power signal switch 54(1)(B) to the physical port 34(B) is shown as a dashed line. Additionally, the power signal switch 54(2)(B) is closed, and the power signal switch 54(2)(A) is opened. Accordingly, the port power controller 52(2) connects to the physical port 34(B) but is disconnected from the physical port 34(A), i.e., the disconnected path 106 from the power signal switch 54(2)(A) to the physical port 34(A) is shown as a dashed line.

In the situation of FIG. 3, the port power controller 52(1) detects the presence of the characteristic impedance through the closed power signal switch 54(1)(A), and then provides a power signal 42 to provide inline power through the closed power signal switch 54(1)(A) and physical port 34(A). As a result, the port power controller 52(1) delivers inline power through the physical port 34(A) and two twisted pairs 112 of the cabling 26(A) (i.e., two pair power, also see the transformers 80(A)(1), 80(A)(2) of FIG. 2). However, as shown by further dashed lines, no inline power is provided through the other two twisted pairs 114 of the cabling 26(A) (i.e., also see the transformers 80(A)(3), 80(A)(4) of FIG. 2). Nevertheless, data communications signals 40 are capable of being exchanged through both twisted pair sets 112, 114 (i.e., all four transformers 80 of the physical port 34(A), see FIG. 2).

Now suppose that the PD 100 indicates that it can receive more than the maximum amount of inline power that can be supplied by the port power controller 52(1) (e.g., during classification or power renegotiation). If the port power controller 52(2) is active (e.g., able to sense) but not currently delivering inline power through any physical port 34, the power signal steering circuitry 56 (FIG. 1) is capable of directing a power signal 42 from the port power controller 52(2) to the physical port 34(A) for four pair power delivery (see the feedback and control signals 64 in FIGS. 1 and 2).

Figure 4:
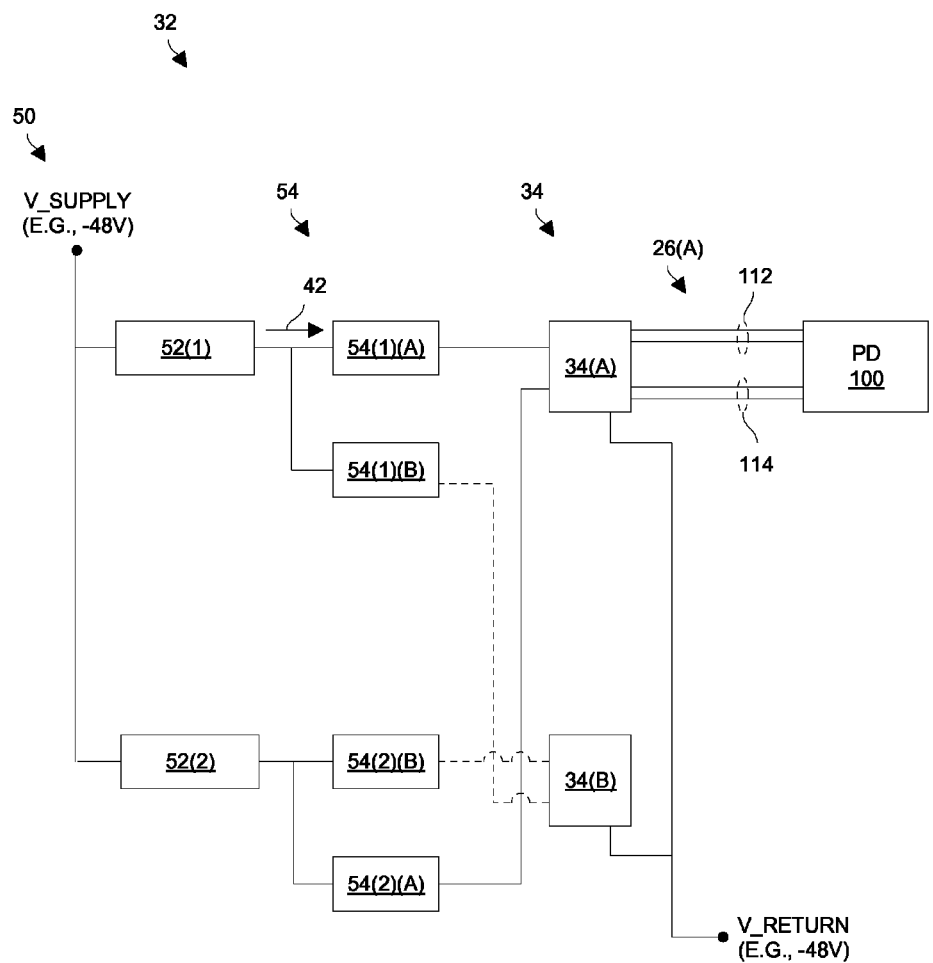
FIG. 4 is a block diagram of a second power delivery topology for the electronic environment of FIG. 1.

FIG. 4 shows a second switch configuration created by the power signal steering circuitry 56 (FIGS. 1 and 2) for four pair power delivery. Here, the power signal switches 54(1)(A) and 54(2(A) are closed, and the power signal switches 54(1)(B) and 54(2)(B) are opened. Accordingly, the port power controllers 52(1), 52(2) connect to the physical port 34(A). However, as shown by dashed lines, the port power controllers 52(1), 52(2) are disconnected from the physical port 34(B). The port power controllers 52(2) are able to provide respective power signals 42 via individual discovery or by discovery by one of the port power controllers 52 and coordination via the power signal steering circuitry 56. As a result, the port power controller 52(1) provides inline power to the PD 100 through the physical port 34(A) and the two twisted pairs 112 of the cabling 26(A), and the port power controller 52(2) provides inline power to the PD 100 through the physical port 34(A) and the two twisted pairs 114 of the cabling 26(A).

Again, data communications signals 40 are capable of being exchanged through both twisted pair sets 112, 114 (i.e., all four transformers 80 of the physical port 34(A), see FIG. 2) while the PSE device 22 delivers four pair power to the PD 100. Moreover, although there is no inline power delivery through the physical port 34(B), data communications signals 40 are capable of being exchanged through the physical port 34(B) with an non-PD style device or a device with external power nevertheless (also see the external device 24(B) in FIG. 1). Such a situation is makes efficient use of the resources of the power delivery circuitry 32. In particular, there is no need to over provision the power delivery circuitry 32 with multiple port power controller 52(1) exclusively dedicated to each physical port 34(B).

Figure 5:
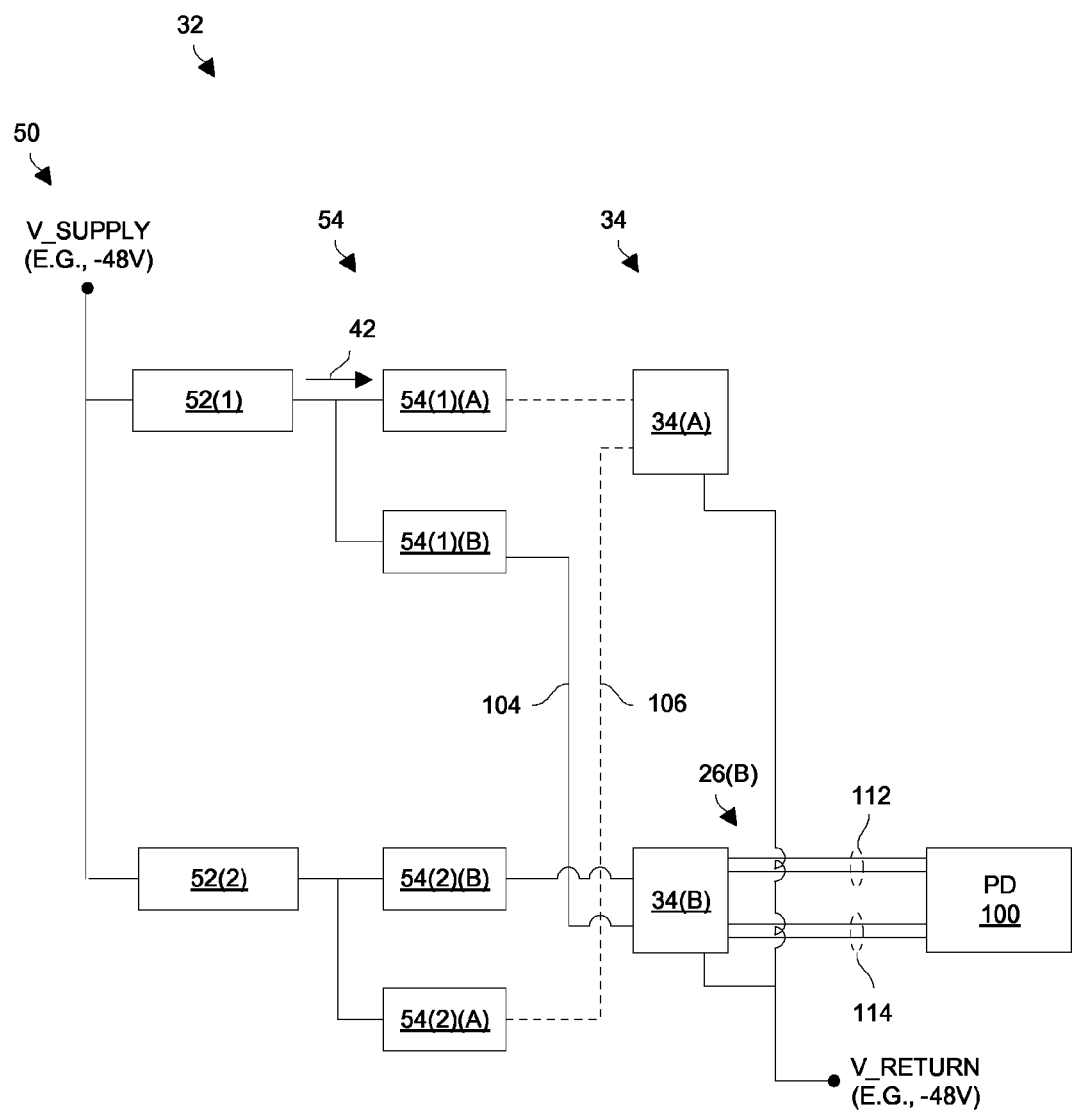
FIG. 5 is a block diagram of a third power delivery topology for the electronic environment of FIG. 1.

FIG. 5 shows a third switch configuration created by the power signal steering circuitry 56 (FIGS. 1 and 2) in order to demonstrate the inline power distribution flexibility provided by the power delivery circuitry 32. Suppose that a PD 100 connects to the physical port 34(B). Such a situation may occur after the configurations of FIGS. 3 and 4.

As shown in FIG. 5, the power signal steering circuitry 56 (FIGS. 1 and 2) provides switch signals 62 to the power signal switches 54 to close power signal switches 54(1)(B) and 54(2)(B), and simultaneously open power signal switches 54(1)(A) and 54(2)(A) as shown by the dashed lines. As a result, the same port power controllers 52(1), 52(2) in the earlier-mentioned switch configurations of FIGS. 3 and 4 deliver inline power through the physical port 34(B) and the two twisted pair sets 112, 114 of the cabling 26(B) (i.e., four pair power).

It should be understood that the various switch configurations described in connection with FIGS. 3 through 5, and others (e.g., two pair power through physical port 34(B), two pair power through both physical ports 34(A), 34(B), and so on) are attainable via operation of the switches 54. Such switch configurations alleviate the need to over provision the PSE device 22 with port power controllers 52 which are exclusively dedicated to particular physical ports 34. Further details will now be provided with reference to FIG. 6.

Figure 6:
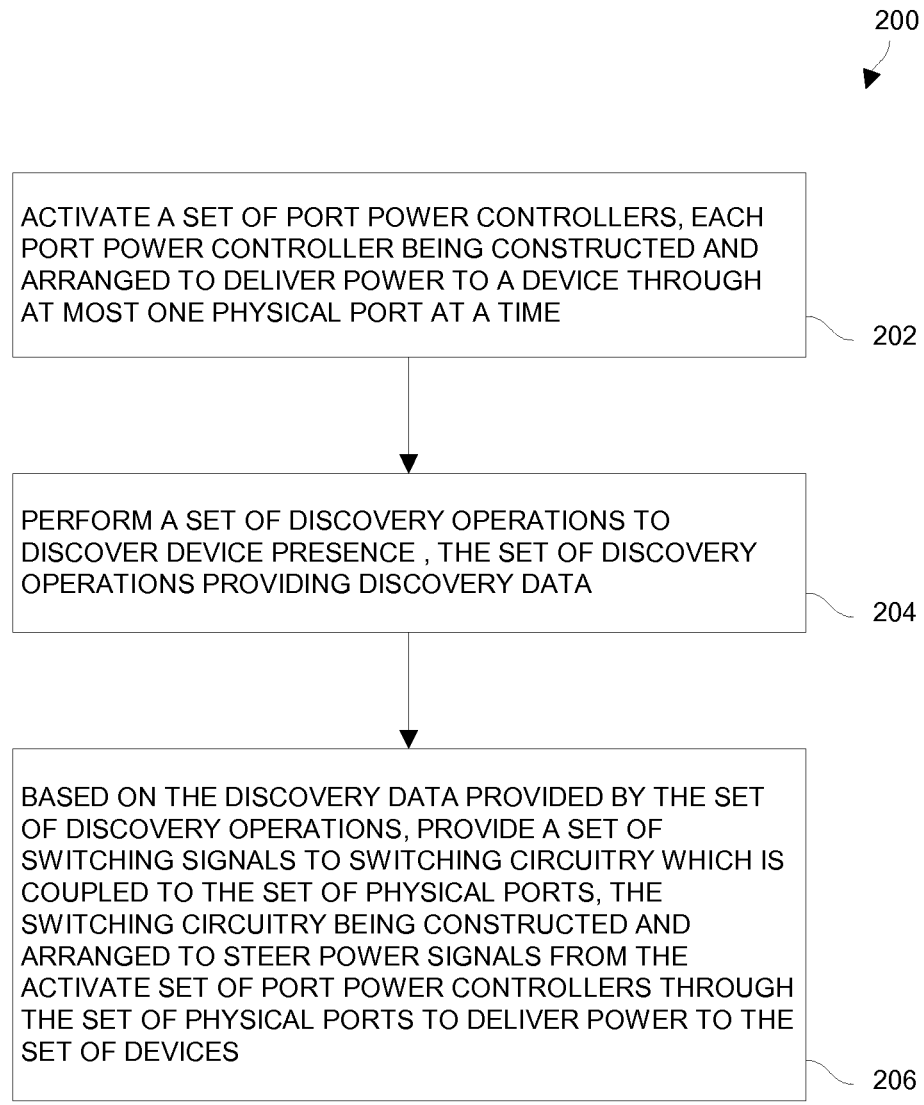
FIG. 6 is a flowchart of a procedure which is performed by control circuitry of the PSE device of FIG. 1.

FIG. 6 shows a flowchart of a procedure 200 which is performed by the PSE device 22 of the electronic environment 20 (FIG. 1). In step 202, the PSE device 22 activates a set of port power controllers 52 where each port power controller 52 is constructed and arranged to deliver power to a device through at most one physical port 34 at a time. Such activation may occur as soon as the PSE device 22 is turned on. At this point, the power signal steering circuitry 56 opens and closes certain switches 54 so that each port power controller 52 is able to sense for the presence of a PD through a particular physical port 34. For example, port power controller 52(1) senses through physical port 34(A), and port power controller 52(2) senses through physical port 34(B).

In step 204, the PSE device 22 performs a set of discovery operations to discover PD presence through the physical ports 34. In particular, the port power controllers 52 sense through the physical ports 34 and provide discovery data to the power signal steering circuitry 56 in the form of the PD discovery signals 60 (FIG. 1). IEEE 802.3af-2003 and IEEE 802.3at-2009 define detection and classification protocols which are suitable for use by the port power controllers 52.

In step 206, the PSE device 22 steers power signals 42 appropriately among the physical ports 34. In particular, the power signal steering circuitry 56 provides, based on the discovery data provided by the set of discovery operations, switching signals 62 to switches 54. As a result, the switches 54 are able to direct delivery of inline power through the physical ports 34 in an efficient and effective manner.

While various embodiments of the invention have been particularly shown and described, it will be understood by those skilled in the art that various changes in form and details may be made therein without departing from the spirit and scope of the invention as defined by the appended claims.

For example, FIG. 1 shows the PSE device 22 as having two port power controllers 52 couple to each physical port 34. In other arrangements, more than two port power controllers 52 couple to each physical port 34. In these arrangements, additional switches 54 reside between the port power controllers 52 and the physical ports 34 to control and connectivity and steering of power signals 42 from the port power controllers 52 to the physical ports 34.

In some arrangements, the PSE device 22 includes some physical ports 34 which are provisioned to provide either 4-pair power or 2-pair power, and other physical ports 34 which are simply provisioned to provide 2-pair power. For example, suppose that a 48 port switch has two rows of physical ports 34, with each physical port 34 having a path to a respective port power controller 52. The switches 54 can be arranged so that the first 24 physical ports 34 (e.g., a row including port #1 through port #24) are capable of providing up to 4-pair power while the last 24 physical ports 34 (e.g., another row including port #25 through port #48) is merely capable of providing 2-pair power. Such a configuration provides enhanced user friendliness in that users can obtain 2-pair power or 4-pair power using physical ports 34 from left to right (e.g., the row of port #1 through port #24).

During operation, if the first 24 physical ports 34 currently provide 4-pair power, the last 24 ports would not provide PoE. In this situation, port #1 connects to the port power controller 52 for port #1 as well as the port power controller 52 for port #48. As a result, port #48 no longer has a connection to its respective power controller 52, but would still be capable of operating as an Ethernet port. Other combinations are available as well.

Additionally, it should be understood that the above-described circuitry is flexible in terms of when and how the switches 54 are turned on and off. In some arrangements, once detection/classification passes on a particular port 34 and the power signal steering circuitry 56 has determined the appropriate 4-pair/2-pair power delivery situation for the electronic environment 20 based on all available data, the power signal steering circuitry 56 opens and closes the appropriate switches 54 to route power to the proper port or ports 34.

Furthermore, it should be understood that it is possible to integrate one or more of the above-described components of the PSE device 22 in a common package or PoE chip. In some arrangements, the switches 54 along with the port power controllers 52 reside in the same integrated circuit device.

What is claimed is:

1. A method, comprising:
   performing, by control circuitry, a set of discovery operations to discover device presence, the set of discovery operations providing discovery data indicating whether an external powered device (PD) connects to a particular port of a set of ports;
   outputting, by the control circuitry, a first switching signal to a first switch based on the discovery data, the first switch being disposed between a first power controller and the particular port; and
   outputting, by the control circuitry, a second switching signal to a second switch based on the discovery data, the second switch being disposed between a second power controller and the particular port, the first power controller and the second power controller being configured to only use the particular port at a time, wherein the first power controller and the second power controller each configured to operate in at least one of a discovery mode to periodically sense for a presence of the external PD or a power mode to perform a periodic power negotiation with the external PD and to determine an amount of power provided by each of the first and second power controllers to the external PD through the particular port based on the periodic power negotiation.

2. A method as in claim 1, further comprising:
   while outputting the first switching signal to the first switch and the second switching signal to the second switch, sending data to the external PD and receiving data from the external PD through the port.

3. A method as in claim 2 wherein outputting the first switching signal includes providing the first switching signal to control opening and closing of the first switch; and
   wherein outputting the second switching signal includes providing the second switching signal to control opening and closing of the second switch independently of opening and closing of the first switch.

4. A method as in claim 3 wherein providing the first switching signal to control opening and closing of the first switch includes closing the first switch;
   wherein providing the first switching signal to control opening and closing of the second switch includes closing the second switch; and
   wherein the first power controller and the second power controller concurrently deliver power to the external PD through the port while the first switch and the second switch are both closed.

5. A method as in claim 4 wherein closing the first switch includes providing a first direct current signal to the external PD from the first power controller through a first set of conductors of the port; and
   wherein closing the second switch includes providing a second direct current signal to the external PD from the second power controller through a second set of conductors of the port.

6. A method as in claim 3 wherein providing the first switching signal to control opening and closing of the first switch includes closing the first switch;
   wherein providing the first switching signal to control opening and closing of the second switch includes opening the second switch;
   wherein the first power controller delivers power to the external PD through the port while the first switch is closed; and
   wherein the second power controller does not deliver power to the external PD through the port while the second switch is open.

7. A method as in claim 6 wherein closing the first switch includes providing a first direct current signal to the external PD from the first power controller through a first set of conductors of the port; and
   wherein opening the second switch includes preventing a second direct current signal from being conveyed to the external PD from the second power controller through a second set of conductors of the port.

8. A method as in claim 6, further comprising:
   outputting, by the control circuitry, another switching signal to another switch, the other switch being disposed between the first power controller and another port.

9. A method as in claim 8 wherein outputting the other switching signal includes opening the other switch to prevent the first direct current signal from being conveyed to another external PD from the first power controller through the other port.

10. A method as in claim 1, further comprising:
    disconnecting all ports from the set of ports except the particular port during the time when the first power controller and the second power controller use the particular port.

11. A method as in claim 10 wherein outputting the other switching signal includes closing the other switch to provide the second direct current signal to another external PD from the second power controller through the other port.

12. A method as in claim 1 wherein each power controller of the first and second power controllers has a maximum power capacity to power at most one external PD at a time.

13. An apparatus, comprising:
a set of physical ports;
a first power controller;
a first switch disposed between the first power controller and a particular physical port of the set of physical ports;
a second power controller, the first power controller and the second power controller each configured to operate in at least one of a discovery mode to periodically sense for a presence of an external powered device (PD) or a power mode to determine perform a periodic power negotiation with the external PD, the first power controller and the second power controller being configured to only use the particular physical port at a time;
a second switch disposed between the second power controller and the particular physical port of the set of physical ports; and
control circuitry coupled to the set of physical ports, the first switch and the second switch, the control circuitry being constructed and arranged to:
perform a set of discovery operations to discover device presence, the set of discovery operations providing discovery data indicating whether the external PD connects to the particular physical port,
output a first switching signal to the first switch based on the discovery data, and
output a second switching signal to the second switch based on the discovery data, operation of the first and second switches controlling an amount of power provided by each of the first and second power controllers to the external PD through the particular physical port based on the periodic power negotiation.

14. An apparatus as in claim 13, further comprising:
data communications circuitry coupled to the set of physical ports, the data communications circuitry being constructed and arranged to send data to the external PD and receive data from the external PD through the particular physical port while the control circuitry outputs the first switching signal to the first switch and the second switching signal to the second switch.

15. An apparatus as in claim 14 wherein the control circuitry, when outputting the first switching signal, is constructed and arranged to provide the first switching signal to control opening and closing of the first switch; and
wherein the control circuitry, outputting the second switching signal, is constructed and arranged to provide the second switching signal to control opening and closing of the second switch independently of opening and closing of the first switch.

16. A computer program product having a non-transitory computer readable medium which stores a set of instructions to control power delivery through a port, the set of instructions, when carried out by computerized circuitry, causing the computerized circuitry to perform a method of:
performing a set of discovery operations to discover device presence, the set of discovery operations providing discovery data indicating whether an external powered device (PD) connects to a particular port of a set of ports;
outputting a first switching signal to a first switch based on the discovery data, the first switch being disposed between a first power controller and the particular port; and
outputting a second switching signal to a second switch based on the discovery data, the second switch being disposed between a second power controller and the particular port, the first power controller and the second power controller being configured to only use the articular port at a time, wherein the first power controller and the second power controller each configured to operate in at least one of a discovery mode to periodically sense for a presence of the external PD or a power mode to perform a periodic power negotiation with the external PD and to determine an amount of power provided by each of the first and second power controllers to the external PD through the particular port based on the periodic power negotiation.

17. A computer program product as in claim 16 wherein the method further comprises:
while outputting the first switching signal to the first switch and the second switching signal to the second switch, sending data to the external PD and receiving data from the external PD through the port.

18. A computer program product as in claim 17 wherein outputting the first switching signal includes providing the first switching signal to control opening and closing of the first switch; and
wherein outputting the second switching signal includes providing the second switching signal to control opening and closing of the second switch independently of opening and closing of the first switch.

* * * * *